R. WOOD.
STANDARD OF POSITION FOR AIRCRAFT.
APPLICATION FILED OCT. 28, 1912. RENEWED OCT. 30, 1914.
1,142,218.
Patented June 8, 1915.
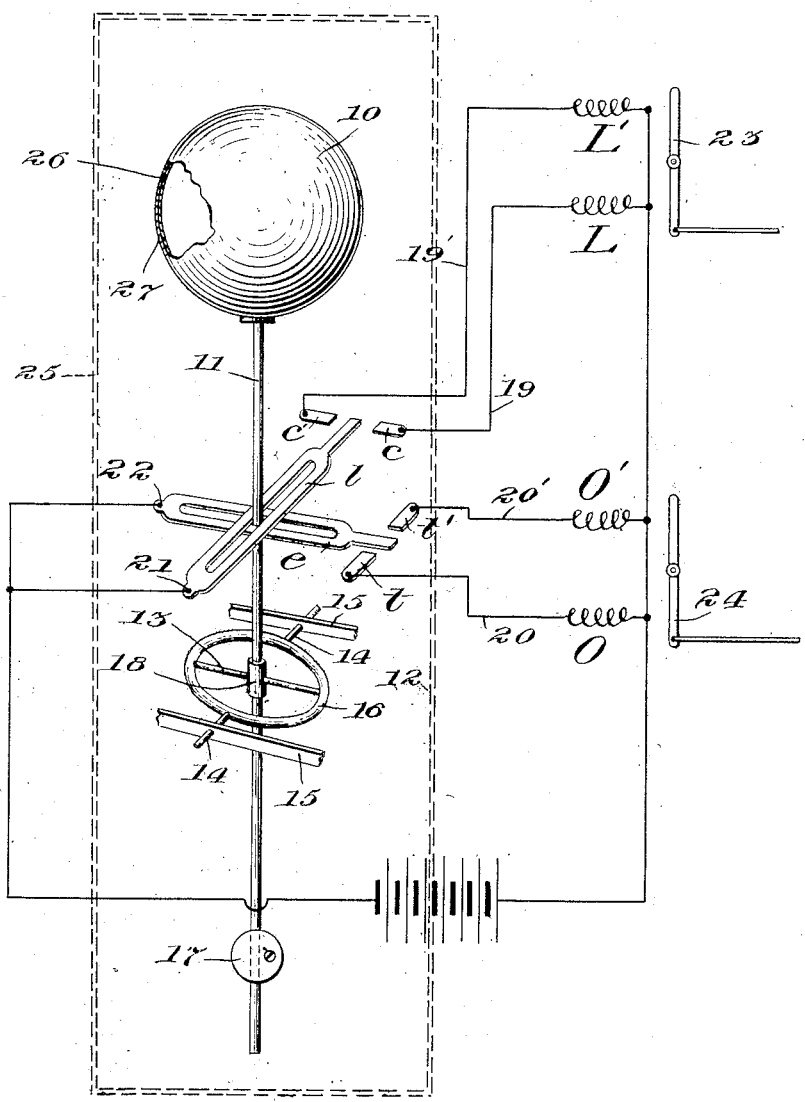
WITNESSES
INVENTOR
Rushmore Wood.
Attorney

UNITED STATES PATENT OFFICE.

RUSHMORE WOOD, OF BROOKLYN, NEW YORK.

STANDARD OF POSITION FOR AIRCRAFT.

1,142,218.     Specification of Letters Patent.     Patented June 8, 1915.

Application filed October 28, 1912, Serial No. 728,227. Renewed October 30, 1914. Serial No. 869,485.

*To all whom it may concern:*

Be it known that I, RUSHMORE WOOD, a citizen of the United States, residing at Brooklyn, in the county of Kings and State of New York, have invented certain new and useful Improvements in Standards of Position for Aircraft, of which the following is a specification, reference being had therein to the accompanying drawings.

My invention consists of a standard of position for aircraft of the type in which the controlling force is a buoyant force exerted in opposition to the force of gravity. This type of standard possesses a great advantage as distinguished from the simple pendulum standard and other types in that the effects of external disturbing forces applied through the craft are nullified. Such forces result through pitching and rocking of the craft, sudden changes in speed, and in making turns, when centrifugal force comes into play.

Broadly speaking my invention comprises a standard of position of this type in which the controlling force is secured through the buoyant force of the air on a member in air as distinguished from other and heavier mediums. Specifically, the member is confined against vertical movement in said medium by connection to a relatively fixed member approximately at its centroid, the construction of the buoyed member being such that the center of pressure of the buoyant force is above the said point of connection at which it is secured.

My invention may be given many specific forms without departing in anywise from its broad nature and generic spirit. These forms will readily occur to those skilled in the art.

For the purpose of the present application I show one of the forms known to me and which appears at present to be the best form. This form of my invention comprises an envelop filled with gas lighter than air constituting a balloon and mounted for pivotal connection to a relatively fixed part of an aircraft or other craft on which it may be desired to use it, said mounting being also provided with a counterbalance for the weight of said gas reservoir and the point of pivotal connection being located at the centroid of the structure whereby the effects of external forces applied through the pivotal connection are nullified.

The single figure of the accompanying sheet of drawing shows diagrammatically the standard of position associated with operating connections for the balancing devices of aircraft in the form of electrical controlling circuits through which actuating magnets governing the balancing devices directly or indirectly are energized.

Referring to this diagram, the balloon is designated 10. This envelop may be made of very light fabric, or of light pressed metal. It is filled with a gas or other medium lighter than air, thus adapting the balloon to float when loosed in the air. It is not necessary as respects my invention however that the weight of the envelop itself be such as to permit it to rise when filled with the gas, as will presently appear, though it is preferable in certain cases that the weight of the envelop permit its rising when loosed. The size and weight of the envelop 10, and the lightness of the gas which it contains will determine the strength of the resultant buoyant force which will be exerted by the air upon the balloon. This balloon 10 is connected by means of a rod 11, (preferably though not necessarily rigidly connected) to a gimbal or universal joint 12 which permits free movement in each of two planes at right angles to each other. The gimbal 12 comprises two pivotal axes 13 and 14 at right angles to each other, the one 14 of which is pivotally supported in beams 15 fixed to the craft and through ring 16 is pivotally connected with the other axis 13 pivotally mounted in the ring itself at right angles to the axis 14. This device is well understood in the art, as well as many other devices of the same type, any of which may be substituted for the one shown.

The rod 11 is extended below the gimbal connection and on its lower end provided with an adjustable counterweight 17, which is of such proportions, and is adjusted to such position as to make the pivotal center 18 of the structure the centroid or center of inertia of the structure. By this is meant that if movement of the structure is effected through force applied to the point 18, the structure will be moved bodily in the direction of the application of the force without change of the angular position of the axis as respects the direction of application of the force applied. Obviously with such a structure mounted upon an aircraft as shown, by pivotal connection at the centroid 18, sudden change in the direction of movement of the craft, or pitching or rocking of the same will not destroy the equilibrium of the device.

For the purpose of illustration the standard is shown as controlling electric circuits two of which 19 and 19' control the lateral balance of the craft, and another two of which 20 and 20' control the longitudinal balance of the craft. Controlling magnets L and L' are located respectively in circuits 19 and 19' while controlling magnets O and O' are connected respectively in circuits 20 and 20'.

Circuits 19 and 19' terminate respectively in fixed contacts c and c' adapted to coöperate with slotted switch lever l which is pivotally connected at 21 to a fixed point and connects with rod 11 through its slot whereby it may be moved right and left to engage contacts c and c' when the craft moves with respect to the standard 10, 11, 17. Similarly the circuits 20 and 20' are connected respectively to contacts t and t' coöperating with slotted switch lever e pivotally connected at right angles at lever l at fixed point 22 whereby longitudinal movement of the craft back and forth with respect to standard 10, 11, 17 causes the closure of circuit 20 or circuit 20' as the case may be. Magnets L L' respectively energized on left and right movement of the craft control operating lever 23 connected either directly to the balancing devices or thereto through an interposed power operated balancing mechanism, the operations of which are governed through the energization of magnets L L'. Similarly the magnets O O' control an operating lever 24 similarly associated with the elevating rudders.

In the normal position of the craft, where the same is on an even keel both laterally and longitudinally, the switch levers l and e do not engage any of the contacts c c' and t t'. Assuming a lateral unbalancing of the craft, the craft with its beams 15, and the fixed points 21, 22 changes its angular position with respect to the standard 10, 11, 17 with the result that circuit 19 or 19' is closed depending upon whether the unbalancing is to right or left, and the corresponding magnet L L' is energized, rocking the armature lever 23 one way or the other to effect the proper movement of the balancing rudders to correct the unbalancing. The circuits 20 20' are similarly closed upon unbalancing in a longitudinal direction either fore or aft. Obviously due to the universal pivoting of the standard 10, 11, 17, and the independently affected switch levers e and l, correction for both longitudinal and lateral balance may be effected at the same time and without the one interfering in any manner with the other. During the entire series of unbalanced movements of the craft the standard 10, 11, 17 which is pivoted at its centroid, is not oscillated irregularly or vibrated from its proper normal position, so that its governing action is accurate, positive, and efficient.

In order to obviate effects of varying head resistances, I inclose the standard of position of my invention within any suitable form of casing within which the air is at atmospheric pressure and yet is not disturbed through the motion of the craft. Such a container is indicated by the dotted line inclosure 25. Any ordinary sheet metal or light wood housing of proportions sufficient to permit free movement of the standard and open at one or more points to the atmosphere will suffice. I do not desire to be limited as to the form of this inclosure which may indeed include the entire power operated balancing mechanism together with the standard. As applied to my standard of position, I consider that this casing is part of my invention in that its use results in freeing the standard from variation of wind pressures on and between its parts.

As is well known the action of temperature on an elastic gas bag causes an expansion of the gas and an increase in its lifting capacity. Such a variation in the buoyant force of the standard would be but slight especially with ordinary temperature variations, but in order to provide against it, I prefer to use an elastic gas container and to inclose the same in a non-elastic aluminum or other light envelop. This arrangement is clearly shown in the drawings at the point where the envelop 10 is broken away. The inner elastic envelop is designated 26 and the outer non-elastic envelop is designated 27. This has the disadvantage that the buoyant force is not the same for all altitudes, but in cases where desired, the elastic envelop 26 may be used alone, whereby it expands as the pressure of the atmosphere decreases on increasing altitude and the buoyant force is maintained more nearly approximately constant.

It is obvious of course that instead of indirectly controlling the balancing rudders through the electrical relay circuits, by making the balloon 10 of sufficient size to provide necessary controlling force, the standard 10, 11, 17 could be connected directly to the balancing rudders to directly operate the same as is the case with many already patented pendulum standards of position.

Furthermore, I wish it understood that for the purpose of clarity I have shown my invention diagrammatically and in connection with the very simplest electrical circuits. My invention however may be used in connection with any of the known power operated automatic balancing mechanisms in place of the usual pendulum, gyroscope, floating device or other standard. When so used I wish it understood that the requisite connections to the follow-up devices used in those mechanisms, and to all parts to which connection of the standard of position should be made, may be made without involving invention.

My invention consists chiefly of the standard of position and as such it may be used in all positions in which standards of position have heretofore been used, and may be used in the future. It is obvious also that instead of using a single standard of position for both lateral and longitudinal balance, separate standards may be used, one for each. In this case a gimbal joint would not be provided, but instead each standard would have motion about a single horizontal axis only. Still further, I consider it within the scope of my invention to mount the standard slightly above or slightly below the centroid as occasion may demand, giving it a slight bias to one direction or the other under varying speed conditions. Thus in machines liable to sudden climbing movements, it might be advisable to pivot the standard slightly below the centroid, whereby the mass above the centroid would tend to throw the pendulum forward to actuate the operating connections to counteract too fast climbing. And finally I consider it likewise within the scope of my invention to make the adjustable counterweight 17 of such proportions and of such form as to in itself be subject to varying head resistances approximately counterbalancing varying head resistances to which the envelop 10 is subjected, whereby the standard of my invention may be used outside of the inclosing casing 25 in more moderate weather conditions. Since the controlling force is the buoyant force of the air on the balloon, and the weight of the balloon envelops are counterbalanced, it is not essential that the balloon when inflated be so light as to rise with the aluminum outer casing. The weight may be easily such as to prohibit using as an ordinary balloon and yet the resultant controlling force will maintain the standard in normal vertical controlling position.

I also consider it within the scope of my invention to mount the standard of position within compressed air or other medium heavier than air compressed or non-compressed. When in a compressed atmosphere the device is independent of changes in altitude. In fact the inclosure for the standard may be hermetically sealed, and the air therein kept at substantially atmospheric pressure, whereby change of volume is prevented and the standard is free from disturbances due to change in altitude, just as free in fact as it would be in a compressed atmosphere. It is of course understood that the inclosure 25 may be made a rigid non-expanding structure or not as desired.

What I claim is:

1. In an aircraft, a standard of position comprising a balloon floating in air and secured to the craft by means permitting relative movement of the craft with respect thereto, and operating connections for balancing devices connected therewith and adapted to effect operation of balancing devices to correct unbalancing of the craft upon the movement of the craft with respect thereto.

2. In an aircraft, a standard of position comprising a balloon floating in air and secured to the craft by means permitting relative movement of the craft with respect thereto, and operating connections for balancing devices connected therewith and adapted to effect operation of balancing devices to correct unbalancing of the craft upon the movement of the craft with respect thereto, together with a counterbalancing means also connected with said balloon and through which the effects of external disturbing forces applied through the craft are nullified.

3. In an aircraft, a standard of position comprising a balloon device in which the controlling force is the buoyant force of the air on the device, the said device including a balloon, its mounting, and counterweight and being pivotally connected with the craft at its centroid, whereby the effects of external disturbing forces applied through the craft are nullified.

4. A standard of position comprising a balloon and rod structure adapted when pivotally mounted to exert a resultant upwardly directed controlling force, and having means on the horizontal axis of the centroid for pivotally connecting said standard with a craft.

5. A standard of position comprising a balloon device consisting of a gas-filled envelop, and a counterweight rigidly connected therewith, together with means for pivotally mounting the same on a horizontal axis located approximately at the centroid of the structure.

6. A standard of position comprising a balloon provided with means for pivotally mounting the same on an aircraft, together with an adjustable counterweight connected therewith on the opposite side of the said pivot, whereby the said counterweight may be adjusted to make the point of pivotal connection the centroid of the structure.

7. In an aircraft, a standard of position comprising a balloon floating in air and secured to the craft by means permitting relative movement of the craft with respect thereto, and operating connections for balancing devices connected therewith and adapted to effect operation of balancing devices to correct unbalancing of the craft upon the movement of the craft with respect thereto, and an inclosure for said standard adapted to preserve still air around said standard at atmospheric pressure.

8. A standard of position comprising a balloon adapted when pivotally mounted at its centroid to exert a resultant upwardly directed controlling force, together with means on the horizontal axis of the centroid for pivotally connecting said standard with a craft, said balloon device comprising an inner elastic gas envelop and an outer non-elastic envelop whereby variations in temperature do not affect the location of the centroid of the structure.

In testimony whereof I affix my signature in presence of two witnesses.

RUSHMORE WOOD.

Witnesses:
Mrs. E. S. MONTGOMERY,
PHILIP L. SIBLEY.